Jan. 31, 1950 H. P. HUTCHINSON 2,495,727

SPEECH PRIVACY APPARATUS

Filed Jan. 7, 1943 2 Sheets-Sheet 1

INVENTOR
HENRY P. HUTCHINSON
BY William D. Hall
ATTORNEY

Jan. 31, 1950 H. P. HUTCHINSON 2,495,727

SPEECH PRIVACY APPARATUS

Filed Jan. 7, 1943 2 Sheets-Sheet 2

INVENTOR
HENRY P. HUTCHINSON
By William D. Hall.
ATTORNEY

Patented Jan. 31, 1950 2,495,727

UNITED STATES PATENT OFFICE 2,495,727

SPEECH PRIVACY APPARATUS

Henry Parks Hutchinson, Washington, D. C.

Application January 7, 1943, Serial No. 471,580

7 Claims. (Cl. 179—1.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for maintaining secrecy of communications, particularly in telephone circuits.

More specifically my invention comprises a communication net-work including at least two stations, one distant and one local, each of said stations having a telephone, a pair of adjustable oscillators arranged so as to be alternately connected to a circuit including said telephone and adapted, when so connected, to modulate the flow of electricity through said circuit at varying frequencies and thus to vary the channels through which communication takes place, and a ciphering machine having a variable cycle of operation, the variations of said machine occurring in a pre-determined sequence of a great number of cycles without repetition, said ciphering machine being connected so that, at each cycle of its operation, one oscillator is connected to the telephone circuit and the other is disconnected therefrom, and the disconnected or idle oscillator is adjusted in accordance with the variations of said ciphering machine so as to select the next channel through which communication takes place.

An object of my invention, therefore, is to provide a communication system having a plurality of adjustable selecting devices such as the oscillators referred to above. Since one of these selecting devices is idle while the other is operating, the idle or disconnected device may be adjusted to select the channel or frequency at which the device will operate when next connected into circuit. Moreover, this adjustment or selection need not be simultaneous at each station but must only be completed before the next cycle of operation takes place and the device is connected into circuit.

It is a further object of my invention to provide at each station in such a communication system, a switch for determining which selecting device is to be operative. The actuation of these switches can vary a trifle from exact synchronism since the operativeness of my device does not require that the sending and receiving stations be exactly synchronized but merely that the oscillators be adjusted to the same frequency and therefore operating through the same channel.

Yet another object of my invention is the provision of a local source of power, such as a battery, at each station so that the operation of the ciphering machine to select the channel next to become operative is independent at each station.

Still an additional object of my invention is the provision of a communication system employing wire circuits connecting the various stations and having oscillators of such a type that the impulse which initiates any cycle of operations cannot be interrupted by an unauthorized person without a direct connection to the wire circuit.

Continuing the objects of this invention, there is afforded means whereby any cycle can be caused to commence either (*a*) From one station
(*b*) alternately from either end of the line.

For a further exposition of my invention, reference may be had to the annexed drawings and specification at the end whereof the novel features of my device will be specifically pointed out and claimed.

Figures 1, 3, 4:
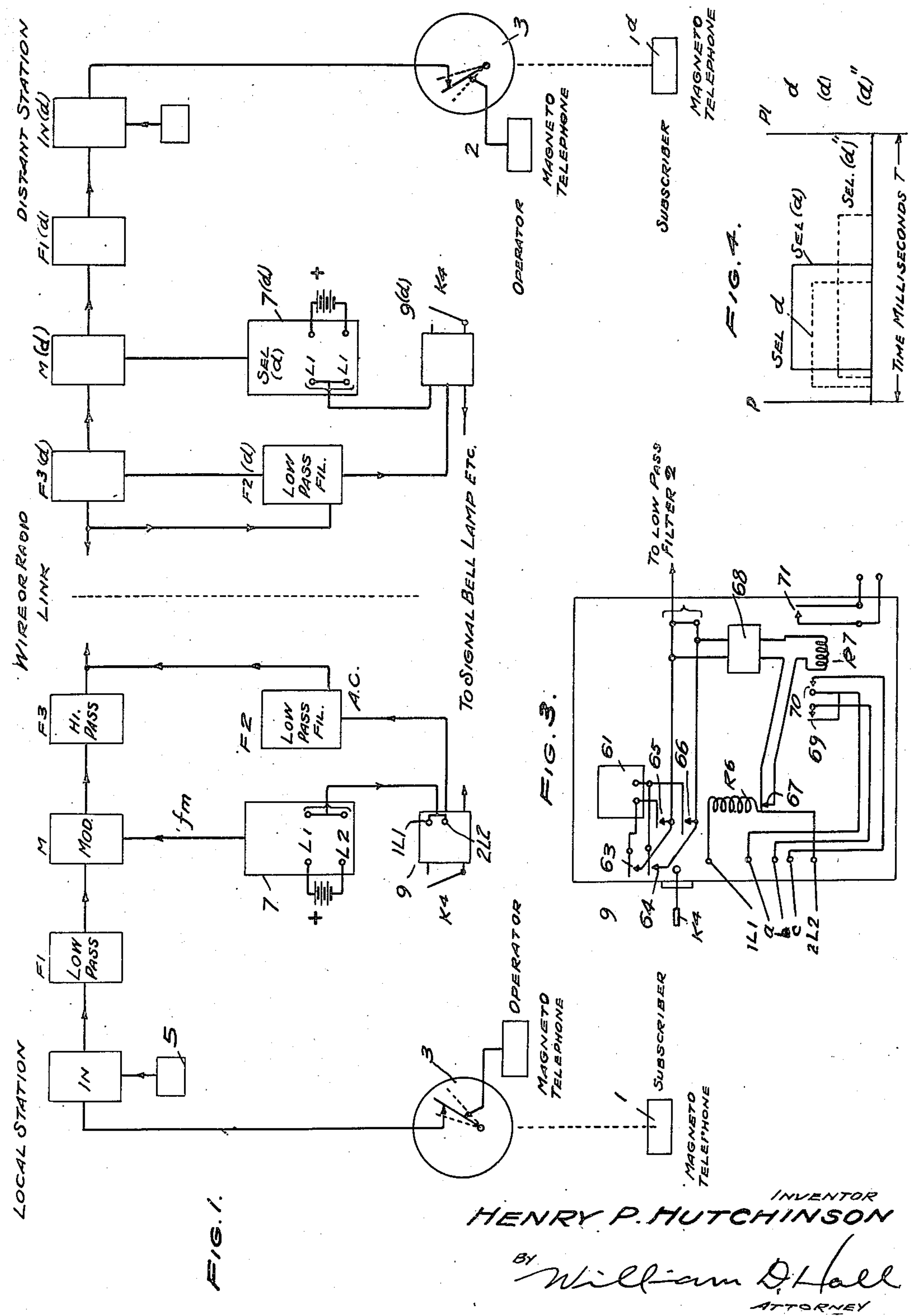
Fig. 1 is a block diagram outlining the communication system including both local and distant stations.
Fig. 3 is a diagram showing by means of blocks and circuit connections, the tone ringer shown as a block in Fig. 1.
Fig. 4 is a representation showing a comparison between electrical impulses of varying duration.

In that embodiment of my invention selected from among others for illustration in the drawings and description in the specification, my device is shown as follows:

In the drawing and specification, like parts are denominated by like letters of reference, the parts at the distant station being distinguished by the same reference character with the addition of the letter *d*.

*Block diagram, Fig. 1*

Referring to Fig. 1, there is disclosed a communication system consisting of at least two stations (two being shown), one local and one distant. Each station includes one or more magneto telephones 1 connected through switch 3 to a frequency inverter In which is also connected under the control of an oscillator 5 having an output frequency. The output of inverter In is connected to a low-pass filter F1 and thence to a modulator M. A selector generally indicated at 7 has its output *fm* fed by a line to the modulator M. Selector 7 also has line terminals $L_1$, $L_2$ which are connected by conductors to the terminals $1L_1$, $2L_2$ of the tone ringer generally indicated at 9, as is shown in greater detail in Figs. 2 and 3, respectively. Tone ringer 9 is connected through low-pass filter F2 to the output side of a high-pass filter F3 which is also connected to the output of modulator M. The combined output of filters F2 and F3 is fed through a wire or radio link forming a communication channel to one or more distant stations.

Figure 2:
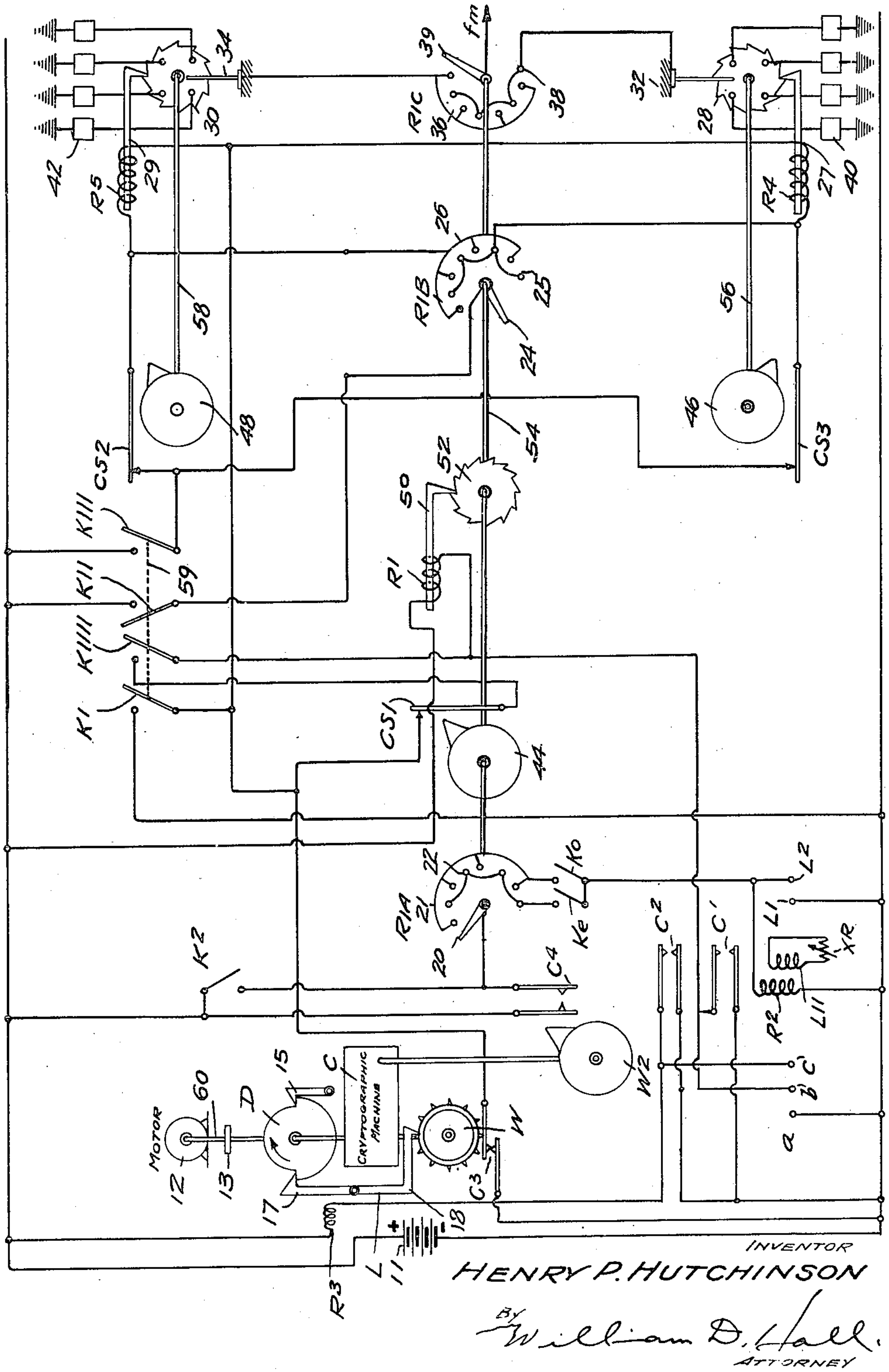
Fig. 2 is a diagrammatic and schematic view of the selector shown as a block in Fig. 1 and forming a part of one of the stations.

*Selector, Fig. 2*

This figure is a diagram in which the plus (+) terminal of battery 11 is at the top of the sheet and the minus (—) terminal is at the bottom. A motor 12 operating through clutch 13 supplies the power to operate a ciphering or cryptographic machine (C) practically identical with those disclosed in U. S. Patents Nos. 2,089,603 and 2,247,170 to Hagelin. This machine C includes a detent cam D which is held against movement in one direction by positioning cam 15 and, in the other direction, by a latch generally indicated at L and having a portion 17 cooperating with cam D. Latch L is mounted under the control of the armature of relay R3. Latch L also has a portion 18 which, when cam D is in a locking position, prevents operation of a star wheel W. When cam D does not lock star wheel W, star wheel W is turned by the motor 12 acting through the cryptographic or ciphering elements C and thus causing operation of switch C3. Motor 12 also actuates, through detent D and ciphering machine C, cam W2 controlling the operation of switch C4.

Starting switch K2 is connected in parallel with switch C4 and, in series with this parallel arrangement, is connected a multi-contact switch R1A having a movable contact 20 and a pair of banks of stationary contacts 21 and 22. Manually operable switches Ko and Ke cooperate with banks 21 and 22, respectively. In series with switches Ko and Ke is connected a parallel arrangement consisting of the coil of relay R2 and line terminal L2. Relay R2 has a delay winding L11 thereon. An adjustable resistance XR is connected in series with winding L11. Relay R2 has an armature which operates switch C2 connected in series with the coil of relay R3. Relay R2 also operates switch C1 which is connected in parallel with a circuit containing a manually-operable switch K1111 and a cam-operated stopping switch CS1, these parallel circuits being connected in series with the coil of relay R1. Connected in series with a manually-operable switch K1 are the coils of relays R4 and R5 and cam-operated stepping switches CS2 and CS3, which are connected in parallel with each other and in series with manually operated switch K111. Manually operated switch K11 is connected in series with the movable contact 24 of multi-contact switch R1B having a pair of banks of stationary contacts 25 and 26 which are respectively connected to the coils of relays R4 and R5. Relays R4 and R5 operate pawls 27 and 29 which rotate selecting switches 28 and 30 respectively which, in turn, contact with stationary contacts 32 and 34 which are each connected to a bank of stationary contacts 36 or 38 of multi-contact switch R1C which has a movable contact 39 from which the output current *fm* is led. Switches 28, 32, and 30, 34 each select a desired output frequency of oscillator 40 or 42 respectively. Cams 44, 46 and 48 operate switches CS1, CS2 and CS3, respectively. Relay R1 has an armature in the form of a pawl 50 which rotates ratchet 52. Movable contact 20, cam 44, ratchet 52 and movable contacts 24 and 39 are all mounted on shaft 54 so as to be simultaneously operated by relay R1. Cams 46 and 48 are respectively mounted on shafts 56 and 58 of switches 28 and 30 and serve to operate stepping switches CS3 and CS2. Shafts 54, 56, and 58 together with shaft 60, which drives clutch 13, detent cam D, and cam W2, are represented on the drawing by dotted lines. Switches K1, K11, K111 and K1111 are ganged together by means of a connector 59 shown in dotted lines. The ganging or interlock between these switches is such that K11 is always in the opposite position from switches K1, K111 and K1111. The selectors also include line terminals L1, L2, *a*, *b*, and *c* which are connected by a cable to the correspondingly marked terminals of the tone ringer next to be described.

*Tone ringer, Fig. 3*

The tone ringer is generally indicated at 9 and comprises a manually operable non-locking signaling key K4 which controls pairs of contacts 63 and 64 connected to tone oscillator 61 and connected, respectively, in parallel with pairs of contacts 65 and 66 under the control of the coil of relay R6 which also controls contacts 67 in series with the coil of relay R7 and amplifier detector 68. Relay R7 actuates contacts 69, 70, and 71 which last are in the circuit of a signal indicator such as a lamp, bell or the like. If wire circuits permitting direct current signaling are used between the various stations, then the tone oscillator may be replaced by a line battery and the amplifier detector eliminated.

*Figure 4*

This is a diagram in which the abscissa represents time in milliseconds, the time at which one selecting or initiating pulse occurs being shown at P and the time at which the next selecting or initiating pulse being shown at P1. The blocks are proportional to the time required for the various selectors labeled Sel. *d*, Sel. *(d)'*, and Sel. *(d)''* to operate to adjust the idle or disconnected oscillator so as to be ready to modulate the voice currents at a few frequency when next the oscillator is connected into circuit.

*Operation*

In order to receive communications at each station, the ciphering device C is adjusted according to a predetermined agreement so that each device actuates switch C3 and the mechanisms controlled thereby a similar, varying amount at each cycle of operation of the device. In other words, at each cycle, star wheel W closes switch C3 the same or a different number of times so that the mechanisms controlled by switch C3 are stepped a corresponding number of times and a different channel selected. The variations of the ciphering machine occur in a fixed or predetermined sequence or series depending upon the adjustment of the ciphering device, but this sequence or series does not repeat itself except after such a large number of cycles as could only be expressed by an astronomical number. The means by which adjustment of the ciphering machine is made and the mode of operation thereof are set forth in the Hagelin patents above referred to.

To insure that each station of the communication network is in proper condition to receive communications over the channel initially selected and to continue to change to each channel as it is selected, switches K1 and K111 and K1111 are closed and switch K11 is opened. This connects the coils of relays R1, R4 and R5 across the terminals of battery 11 under the respective control of stepping switches CS1, CS3, and CS2. The energization of its coil causes relay R1 to turn shaft 54 until movable contacts 20, 24, and 39 are in the proper initial position resting upon the desired cooperating stationary contacts at which time cam 44 opens switch CS1 and stops further movement. Likewise, energization of the coils of relays R4 and R5 causes these coils to turn switches 28, 32, and 30, 34, respectively, and thus adjust the oscillators 40 and 42 until a desired channel is connected from that oscillator which is connected into circuit. Then cams 46 and 48 open switches CS3 and CS2, respectively. When the movable contacts 20, 24, and 39 and oscillators 40 and 42 have all been moved into the desired position so that their elements occupy the same position at each station, the network is in condition to begin operations. Switches K1, K111 and K1111 are then opened and switch K11 is closed.

The operator closes switch K2 which closes a circuit through movable switch contact 20, which may be assumed to be in engagement with a contact of bank 21 and switch Ko, which may be assumed to be closed, thus energizing the coil of relay R2 and transmitting a pulse over the line whose terminals are L1, L2. This causes relay R2 to close switches C1 and C2. Closure of switch C1 energizes the coil of relay R1 causing pawl 50 to rotate ratchet 52 and, consequently, shaft 54 and movable contacts 20, 24, and 39 mounted thereon, one step. This movement of contact 20 opens circuit with stationary contact bank 21 thus de-energizing the coil of relay R2. Movement of contact 24 out of engagement with stationary contact bank 26 and into engagement with stationary contact bank 25 shifts the coil of relay R5 out of circuit and the coil of relay R4 into circuit. So also the operation of switch R1C disconnects the output from oscillator 42 from the circuit and connects the output from oscillator 40 into circuit.

Simultaneously, switch C2 is closed, which connects the coil of relay R3 into circuit so that latch L has portion 17 withdrawn from detent cam D and part 18 withdrawn from star wheel W. Motor 12 turns shaft 60 whereby star wheel W is rotated an amount depending upon the adjustment of the ciphering device. This rotation causes switch C3 to be closed a number of times depending upon the amount of rotation of star wheel W. Thus a circuit is closed through switch C3, the coil of either relay R4 or R5 (depending upon whether movable contact 24 is in engagement with stationary contact bank 25 or 26) and switch K11.

Referring now to Figs. 1, 2, and 3, while the above mentioned events have been occurring, energy has been applied through the line having terminals L1, L2 to the tone ringer 9 at the same station. Such a tone ringer is shown in Fig. 3. This energy enters tone ringer 9 through contacts 1L1, 2L2 and energizes the coil of relay R6 which also has an armature which operates switch contacts 65, 66 closing circuit through tone oscillator 61 and transmitting a pulse through low-pass filter F2 over the wire or radio link to the distant station or stations of the network. At such distant station such a pulse passes through low-pass filter F2 (*d*) to the tone ringer 9 (*d*) where the pulse passes through amplifier 68 (*d*) and energizes the coil of relay R7 (*d*) closing switch contacts 69 (*d*), 70 (*d*), and 71 (*d*). Contacts 71 (*d*) close the circuit of an indicator. Contacts 69 (*d*), 70 (*d*), close a circuit through the line whose terminals are *a* (*d*), *b* (*d*), and *c* (*d*) and transmitting the pulse to the corresponding terminals of the distant selector 7 (*d*), where the circuit is completed through the positive terminal of switch C1 (*d*) and the coil of relay R1 (*d*). This causes shaft 54 (*d*) to be rotated one step to adjust the distant movable switch contacts 20 (*d*), 24 (*d*) and 39 (*d*) whereby the distant selector 7 (*d*) is adjusted so that if oscillator 42 of the local station is operating at a certain frequency, oscillator 42 (*d*) of the distant station is adjusted to operate at the same frequency.

Relay R6 is a quick acting relay while, due to winding L11 and its associated, adjustable resistor XR, relay R2 is a delayed-acting relay. Because of this, when the coils of both these relays are energized simultaneously, relay R6 has an opportunity to transmit a pulse to the distant selector 7 (*d*) and to cause it to step before local relay R2 operates and breaks circuit by shifting movable contact 20 into engagement with a contact of stationary contact bank 22.

During each cycle of operation, after star wheel W has completed its movement and adjusted the idle oscillator, cam W2 comes into operation and closes switch C4, which is connected in parallel with starting switch K2. Since movable switch contact 20 has moved out of engagement with a contact of bank 21 and into engagement with a contact of bank 22, no action takes place if switch Ke is open. If, however, switch Ke is closed, the coil of relay R2 is energized and the next cycle of operations similar to the initial cycle is commenced. Thus it will be seen that a cycle of operation can only be initiated at that station at which the movable contact 20 is in engagement with a contact of that bank of stationary contacts 21 or 22 in series with which the corresponding switch Ke or Ko is closed. In other words, if both switches Ko and Ke are closed at one station, the communication channels can only be shifted from that end but if switch Ko is closed at the local station and switch Ke (*d*) is closed at the distant station, the initiating impulses originate from the two stations alternately.

I claim:

1. Means for maintaining secrecy of telephone conversations comprising a source of power, at least one local and one distant station, each of said stations including a telephone, a pair of oscillators each adapted to modulate the flow of electricity to and from said telephone at a number of different frequencies, a switch connecting said telephone under the control of one or the other of said oscillators, a pair of motors each connected to one of said oscillators so as to adjust the same to any one of a number of desired frequencies, a second switch connecting one or other of said motors across said source of power, and a ciphering machine having a varying cycle of operations, said variations occurring in a predetermined sequence of a great number of cycles of operation without repeating, said machine being connected so as to operate said switches to shift the connection to said telephone from one oscillator to the other and to connect the motor controlling the disconnected oscillator under the control of said machine.

2. In a system of the nature described, a communication apparatus, a plurality of communication channels fed by said apparatus, an oscillator connected into each of said channels, a switch between said apparatus and said oscillators for selectively connecting said apparatus and one of said oscillators while disconnecting said apparatus from the other of said oscillators, a translating device associated with each of said oscillators for selecting a channel controlled by said switch, a source of power for said translating devices, means for controlling the operation of said translating devices said last-mentioned means providing an unpredictable sequence of controlling impulses, and a second switch between said last-mentioned means and said translating devices arranged to disconnect said means from an operative translating device and to connect the same to an inoperative translating device.

3. In an apparatus of the nature described, a local station and a distant station each of said stations comprising a communication equipment embodying variable means for selecting a communication channel from among a plurality of channels each of said variable means being driven by a motor the said motors being connected by a switch permitting operation of but one motor at a time, means for determining the amount of motion of said motors said last-mentioned means being in the nature of a key generator providing an unpredictable sequence of motor actuating impulses, a switch operated periodically by said last-mentioned means to stop the same said last-mentioned switch having a plurality of stationary contacts, and a plurality of further switches cooperating therewith and with the other station for determining the station from which said last-mentioned means may be controlled.

4. In a system for privately transmitting information, the combination of a pair of communication apparatuses between which communication may be established over a plurality of channels each apparatus including plural means each supplying a plurality of different fixed carrier frequencies and a switch for selectively connecting said means to said channels, means for switching from one channel to another for communication purposes according to an unpredictable rule, and means for switching another carrier frequency to a channel before selection thereof for communication.

5. Means for maintaining secrecy of telephone conversations, comprising a source of power, at least one local and one distant station each of said stations including a telephone, a plurality of oscillators each adapted to modulate the flow of electricity to and from said telephone at a number of different frequencies, a switch connecting said telephone under the control of one or another of said oscillators, means for adjusting each of said oscillators to any one of a number of desired frequencies, a second switch connecting said last-mentioned means across said source of power, and means for operating said switches in accordance with an unpredictable rule to shift the connection to said telephone from one oscillator to another and to vary the frequency of the disconnected oscillator.

6. In a system for private communication, the combination of at least two stations, a plurality of communication channels extending between said stations, a channel selector at each of said stations each selector comprising a plurality of contacts arranged in groups equal in number to the said communication channels said contacts being arranged in an order not related to their grouping and adapted to have contact made therewith by a cooperating switch member, means for driving said switch members in accordance with an unpredictable rule, and means including interlocking switch controlled circuits between said stations for determining the station from which said driving means for said switch members are actuated.

7. In a system for private communication, the combination of at least two stations, a plurality of communication channels extending between said stations, a channel selector at each of said stations each selector comprising a plurality of contacts arranged in groups equal in number to the said communication channels said contacts being arranged in an order not related to their grouping and adapted to have contact made therewith by a cooperating switch member, a motor for driving each of said switch members, a plurality of oscillators providing outputs of different frequencies, means for selectively connecting said oscillators to said channels, and means including interlocking switch controlled circuits between said stations for determining the station from which said motor members are actuated.

HENRY PARKS HUTCHINSON.

REFERENCES CITED

The following references are of record in the file of this patent:

UNITED STATES PATENTS

| Number | Name | Date |
|---|---|---|
| 1,571,005 | Hartley | Jan. 26, 1926 |
| 1,573,924 | Fletcher | Feb. 23, 1926 |
| 1,666,651 | Heising | Apr. 17, 1928 |
| 1,709,901 | Espenschied et al. | Apr. 23, 1929 |
| 1,725,566 | Chestnut | Aug. 20, 1929 |
| 1,757,181 | Espenchied | May 6, 1930 |
| 1,816,953 | Bown | Aug. 4, 1931 |
| 2,200,559 | Mitchell | May 14, 1940 |
| 2,204,050 | Purington | June 11, 1940 |
| 2,213,320 | Mathes | Sept. 3, 1940 |
| 2,301,223 | Mitchell | Nov. 10, 1942 |
| 2,402,059 | Craib | June 11, 1946 |